United States Patent
Asai et al.

(10) Patent No.: US 10,889,331 B2
(45) Date of Patent: Jan. 12, 2021

(54) EXTERIOR SILENCER FOR MOTOR VEHICLE

(71) Applicant: HOWA CO., LTD., Kasugai (JP)

(72) Inventors: Takahiro Asai, Kasugai (JP); Akihiro Shirai, Kasugai (JP)

(73) Assignee: HOWA CO., LTD., Kasugai (JP)

( * ) Notice: Subject to any disclaimer, the term of this patent is extended or adjusted under 35 U.S.C. 154(b) by 0 days.

(21) Appl. No.: 16/339,747

(22) PCT Filed: Jul. 6, 2018

(86) PCT No.: PCT/JP2018/025664
§ 371 (c)(1),
(2) Date: Apr. 5, 2019

(87) PCT Pub. No.: WO2019/054023
PCT Pub. Date: Mar. 21, 2019

(65) Prior Publication Data
US 2020/0047470 A1    Feb. 13, 2020

(30) Foreign Application Priority Data
Sep. 13, 2017    (JP) ................. 2017-175560

(51) Int. Cl.
| | |
|---|---|
| *B32B 1/02* | (2006.01) |
| *B32B 5/02* | (2006.01) |
| *B62D 25/10* | (2006.01) |
| *B32B 27/04* | (2006.01) |
| *B32B 27/12* | (2006.01) |
| *G10K 11/168* | (2006.01) |
| *B60R 13/08* | (2006.01) |
| *B62D 25/12* | (2006.01) |

(52) U.S. Cl.
CPC ............. *B62D 25/105* (2013.01); *B32B 1/02* (2013.01); *B32B 5/022* (2013.01); *B32B 27/04* (2013.01); *B32B 27/12* (2013.01); *G10K 11/168* (2013.01); *B32B 2262/101* (2013.01); *B32B 2605/18* (2013.01); *B60R 13/08* (2013.01); *B62D 25/12* (2013.01)

(58) Field of Classification Search
CPC .... G10K 11/168; B62D 25/105; B62D 25/12; B32B 1/02; B32B 5/022
See application file for complete search history.

(56) References Cited

U.S. PATENT DOCUMENTS

| | | |
|---|---|---|
| 2006/0113146 A1 | 6/2006 | Khan et al. |
| 2007/0287001 A1 | 12/2007 | Carlson et al. |
| 2012/0037447 A1 | 2/2012 | Duval et al. |

FOREIGN PATENT DOCUMENTS

| | | |
|---|---|---|
| CN | 1720569 A | 1/2006 |
| CN | 102481881 A | 5/2012 |
| FR | 2 942 437 A1 | 8/2010 |
| JP | 2005-263119 A | 9/2005 |
| JP | 2006-511830 A | 4/2006 |
| JP | 2012-518572 A | 8/2012 |

(Continued)

*Primary Examiner* — Walter Aughenbaugh
(74) *Attorney, Agent, or Firm* — Oliff PLC

(57) ABSTRACT

A hood silencer includes a back skin layer, a thin film layer, a first shape-retaining layer, a sound-absorbing layer, a second shape-retaining layer, an aeration-suppressing layer, and a front skin layer. The aeration-suppressing layer suppresses oozing of a binder resin out of the surface of the front skin layer from the second shape-retaining layer during the heat forming of the second shape-retaining layer.

20 Claims, 9 Drawing Sheets

(56) References Cited

FOREIGN PATENT DOCUMENTS

| | | |
|---|---|---|
| JP | 2016-20158 A | 2/2016 |
| WO | 2007/141172 A1 | 12/2007 |
| WO | 2011/045950 A1 | 4/2011 |

*Fig.4*

Table — 1

|  | basis weight (g/m²) | | |
| --- | --- | --- | --- |
|  | working example 1 | working example 2 | working example 3 |
| aeration-suppressing layer | 20 | 40 | 60 |
| front skin layer | 80 | 80 | 80 |
| total basis weight | 697 | 717 | 737 |

*Fig.5*

Table – 2

|  | skin air permeability (cc/s/cm$^2$) | | |
| --- | --- | --- | --- |
|  | working example 1 | working example 2 | working example 3 |
| uncompressed portion | 60 | 35 | 10 |
| compressed portion | 31 | 16 | 3 |

Fig.6

Table — 3

| frequency(Hz) sample | 400 | 500 | 630 | 800 | 1000 | 1250 | 1600 | 2000 | 2500 | 3150 | 4000 | 5000 | 6300 |
|---|---|---|---|---|---|---|---|---|---|---|---|---|---|
| working example 1 | 0.30 | 0.45 | 0.65 | 0.88 | 1.09 | 1.19 | 1.16 | 1.06 | 0.97 | 0.94 | 0.97 | 1.00 | 0.99 |
| working example 2 | 0.31 | 0.44 | 0.62 | 0.81 | 1.01 | 1.13 | 1.14 | 1.03 | 0.90 | 0.86 | 0.90 | 0.96 | 0.94 |
| working example 3 | 0.32 | 0.41 | 0.55 | 0.69 | 0.91 | 1.03 | 1.01 | 0.89 | 0.72 | 0.69 | 0.70 | 0.74 | 0.68 |
| comparative example | 0.31 | 0.45 | 0.65 | 0.87 | 1.01 | 1.05 | 1.07 | 1.03 | 1.01 | 1.00 | 0.98 | 0.99 | 0.98 |

EXTERIOR SILENCER FOR MOTOR VEHICLE

BACKGROUND OF THE INVENTION

Field of the Invention

The present invention relates to an exterior silencer for a motor vehicle such as a hood silencer or the like to be arranged on a hood or bonnet of the motor vehicle.

Description of Related Art

Conventionally, in this kind of an exterior silencer for a motor vehicle, a bonnet insulator described in JP2005-263119A is proposed. The bonnet insulator is formed by providing a reinforcing layer between a sound-absorbing layer and a front skin layer so as to laminate the sound-absorbing layer, the reinforcing layer and the front skin layer. A laminate body comprising the sound-absorbing layer, reinforcing layer, and front skin layer laminated in such a manner is formed into a predetermined shape under heat and pressure.

Herein, the sound-absorbing layer is made of a porous material. The reinforcing layer is formed in a mattress shape by binding with a binder resin fibers including an inorganic material such as glass, carbon or the like as a main component. The front skin layer is made of a thermoplastic synthetic resin material such as polyester, polypropylene or the like.

By the way, a bonnet insulator formed as described above is recently required to have good appearances. For working example, in selling the bonnet insulator, it tends to increase importance significantly that a bonnet insulator has good appearances.

However, when the laminate body comprising the sound-absorbing layer, reinforcing layer, and front skin layer is heated and pressed, as described above, the binder resin is extruded by pressure while hardening by heating, thereby to ooze out from the reinforcing layer through the front skin layer to a surface of the front skin layer. Especially in case the bonnet insulator has thickness deviation, a larger amount of the binder resin tends to be extruded toward the front skin layer and ooze out in highly compressed portion of the bonnet insulator.

Accordingly, the binder resin oozed out in this way stains the surface of the front skin layer. As a result, the appearance of the front skin layer deteriorates. This means that the appearance and beauty as the bonnet insulator deteriorate.

Not only the oozing out of the binder resin from the reinforcing layer, but also oozing out of the binder resin from an interior portion of the entirety of the laminate body to the front skin layer deteriorates the appearance and beauty as the bonnet insulator as well.

Accordingly, not only the merchantability as the insulator deteriorates, but as a result, there occurs drawbacks that sales of the insulator is hindered.

SUMMARY OF THE INVENTION

It is therefore an object of the present invention to provide an exterior silencer for a motor vehicle capable of preferably suppressing oozing out of a binder resin at least to the front skin layer.

In order to solve the object according to the present invention, there is provided an exterior silencer for a motor vehicle to be arranged on an exterior portion of a vehicle compartment of the motor vehicle, the exterior silencer comprising:

a sound-absorbing layer made of a sound-absorbing material;

a shape-retaining layer formed by binding fibers made of an inorganic material with a binder resin, said shape-retaining layer being laminated on said sound-absorbing layer;

a front skin layer made of a thermoplastic synthetic resin material and laminated on said shape-retaining layer; and an aeration-suppressing layer laminated between said shape-retaining layer and said front skin layer, wherein said aeration-suppressing layer is formed with nonwoven fabric so as to have a basis weight within a predetermined basis weight range and an airflow quantity within a predetermined airflow quantity range which are suitable for suppressing oozing of said binder resin from said shape-retaining layer upon being molded so as to be formed into a predetermined laminated body by heating and pressing together with said sound-absorbing layer, said shape-retaining layer and said front skin layer.

According to this construction, the shape-retaining layer is formed by binding fibers made of an inorganic material with a binder resin, and the aeration-suppressing layer is laminated between the shape-retaining layer and the front skin layer.

Herein, the aeration-suppressing layer is, as described above, formed with nonwoven fabric so as to have a basis weight within a predetermined basis weight range and an airflow quantity within a predetermined airflow quantity range which are suitable for suppressing oozing of the binder resin from the shape-retaining layer upon being molded so as to be formed into a predetermined laminated body by heating and pressing together with the sound-absorbing layer, the shape-retaining layer and the front skin layer.

Thus, even if the liquid binder resin oozes out while hardening during the heat forming of the shape-retaining layer, such oozing out of the oozing binder resin to the front skin layer can be suppressed effectively by the aeration-suppressing layer under the basis weight and airflow quantity thereof.

Accordingly, the front skin layer can secure good appearance at its surface without staining with the oozing binder resin from the shape-retaining layer.

Further, the present invention is characterized in that in the above exterior silencer for a motor vehicle, it comprises with said shape-retaining layer as a first shape-retaining layer:

a second shape-retaining layer formed by binding fibers made of an inorganic material with a binder resin, said shape-retaining layer being laminated on said sound-absorbing layer from the side opposite to said first shape-retaining layer; and a non-air permeable thin film layer laminated on said second shape-retaining layer so as to oppose said sound-absorbing layer through said second shape-retaining layer.

According to this construction, the second shape-retaining layer, which is laminated, a portion from the first shape-retaining layer, on the sound-absorbing layer from the side opposite to the first shape-retaining layer, is formed by binding fibers made of an inorganic material with a binder resin like the first shape-retaining layer. In addition, the non-air permeable thin film layer is laminated on the second shape-retaining layer so as to be opposed to the sound-absorbing layer through the second shape-retaining layer.

Thus, even if the liquid binder resin oozes out while hardening during the heat forming of the second shape-retaining layer, such oozing out of the oozing binder resin to the non-air permeable thin film layer can be suppressed effectively by the non-air permeable thin film layer.

Accordingly, the non-air permeable thin film layer can secure good appearance at its surface without staining with the oozing binder resin from the second shape-retaining layer.

This means that the exterior silencer can preferably maintain good appearance at both of the front surface (the front surface of the front skin layer) and the back surface (the back surface of the non-air permeable thin film layer) thereof without staining with the oozing binder resin.

Further, the present invention is characterized in that in the above exterior silencer for a motor vehicle, it comprises said shape-retaining layer as a first shape-retaining layer:

a second shape-retaining layer formed by binding fibers made of an inorganic material with a binder resin, said shape-retaining layer being laminated on said sound-absorbing layer from the side opposite to said first shape-retaining layer; and a back skin layer made of nonwoven fabric so as to be laminated on said second shape-retaining layer opposing said sound-absorbing layer through said second shape-retaining layer.

According to this construction, the second shape-retaining layer, which is laminated, a portion from the first shape-retaining layer, on the sound-absorbing layer from the side opposite to the first shape-retaining layer, is formed by binding fibers made of an inorganic material with a binder resin like the first shape-retaining layer. In addition, the back skin layer is laminated on the second shape-retaining layer opposing the sound-absorbing layer through the second shape-retaining layer.

Thus, even if the liquid binder resin oozes out while hardening during the heat forming of the second shape-retaining layer, such oozing out of the oozing binder resin to the back surface of the back skin layer can be suppressed by the non-air permeable thin film layer. Accordingly, the back skin layer can secure good appearance at its back surface without staining with the oozing binder resin from the second shape-retaining layer.

This means that the exterior silencer can preferably maintain good appearance at both of the front surface (the front surface of the front skin layer) and the back surface (the back surface of the non-air permeable thin film layer) thereof without staining with the oozing binder resin.

Herein, the present invention may be provided with a non-air permeable thin film layer laminated between said second shape-retaining layer and said back skin layer.

According to this construction, even if the liquid binder resin oozes out while hardening during the heat forming of the second shape-retaining layer, such oozing out of the oozing binder resin to the back surface of the back skin layer can be prevented preferably by the non-air permeable thin film layer. Accordingly, the back skin layer can secure good appearance at its back surface without staining with the oozing binder resin from the second shape-retaining layer.

This means that the exterior silencer can preferably maintain good appearance at both of the front surface (the front surface of the front skin layer) and the back surface (the back surface of the non-air permeable thin film layer) thereof without staining with the oozing binder resin under the adoption of non-air permeable thin film layer.

Still further, the present invention is characterized in that in the above exterior silencer for a motor vehicle, said fibers made of the inorganic material among materials for forming said first shape-retaining layer are glass fibers, and the sound-absorbing material as a material for forming said sound-absorbing layer is a urethane resin.

According to this construction, even though a urethane resin which is the sound-absorbing material for the sound-absorbing layer is inferior in terms of heat resistance and rigidity, the first shape-retaining layer demonstrates preferable rigidity under binding by binder of glass fibers, thereby to become hard to deform.

Thus, the first shape-retaining layer can prevent the deformation of the shape of the sound-absorbing layer with its rigidity. As a result, even if the sound-absorbing layer is formed by a urethane resin, the exterior silencer can maintain a preferable shape without deformation so as to keep excellent merchantability, thereby to be capable of improving the above-mentioned operation and effect of the present invention.

The present invention is characterized in that in the above exterior silencer for a motor vehicle, said fibers made of the inorganic material among materials for forming said second shape-retaining layer are glass fibers, and the sound-absorbing material as a material for forming said sound-absorbing layer is a urethane resin.

According to this construction, even though a urethane resin which is the sound-absorbing material for the sound-absorbing layer is inferior in terms of heat resistance and rigidity, the second shape-retaining layer demonstrates preferable rigidity under binding by binder of glass fibers, thereby to become hard to deform. Thus, the second shape-retaining layer can prevent the deformation of the shape of the sound-absorbing layer with its rigidity.

As a result, even if the sound-absorbing layer is formed by a urethane resin, the exterior silencer can maintain a preferable shape without deformation so as to keep excellent merchantability, thereby to be capable of improving the above-mentioned operation and effect of the present invention.

The present invention is characterized in that in the above exterior silencer for a motor vehicle, the predetermined basis weight range of said aeration-suppressing layer is set to 10 $(g/m^2)$ to 40 $(g/m^2)$ and the predetermined airflow quantity range of said aeration-suppressing layer is set to 15 $(cc/s/cm^2)$ to 65 $(cc/s/cm^2)$, and that said front skin layer has a basis weight within a range of 50 $(g/m^2)$ to 160 $(g/m^2)$, and said first shape-retaining layer has a basis weight within a range of 25 $(g/m^2)$ to 130 $(g/m^2)$ and an airflow quantity within a range of 200 $(cc/s/cm^2)$ to 800 $(cc/s/cm^2)$.

According to such the above-mentioned predetermined basis weight range and the above-mentioned predetermined airflow quantity range of the aeration-suppressing layer, the oozing out of the binder resin from the first shape-retaining layer to the front surface of the front skin layer can be more preferably suppressed under the basis weight and airflow quantity of the first shape-retaining layer. As a result, the above-mentioned operation and effect of the present invention can be improved more preferably.

The present invention is characterized in that in the above exterior silencer for a motor vehicle, of which the exterior portion of the vehicle compartment being a hood closing openable an upper opening portion of an engine room of the motor vehicle, it is assembled to the hood from an inside of the engine room as a hood silencer.

By assembling the exterior silencer to the hood as the hood silencer, the above-mentioned operation and effect of the present invention can be achieved as the hood silencer.

BRIEF DESCRIPTION OF THE DRAWINGS

Other features and advantages of the present invention will be apparent from the following description taken in connection with the accompanying drawings.

FIG. 4 is a table showing a basis weight of an aeration-suppressing layer, a basis weight of a front skin layer, and a total basis weight in each working example related to the hood silencer according to the first embodiment as Table-1.

FIG. 5 is a table showing a skin air permeability of each working example of the first embodiment in relation to an uncompressed portion and a compressed portion of each working example as Table-2.

FIG. 6 is a table showing sound absorption coefficients of each working example and comparative example of the first embodiment in relation to frequencies of noises as Table-3.

DETAILED DESCRIPTION OF THE PREFERRED EMBODIMENTS

Embodiments of the present invention will now be described with reference to the drawings.

First Embodiment

Figure 1:
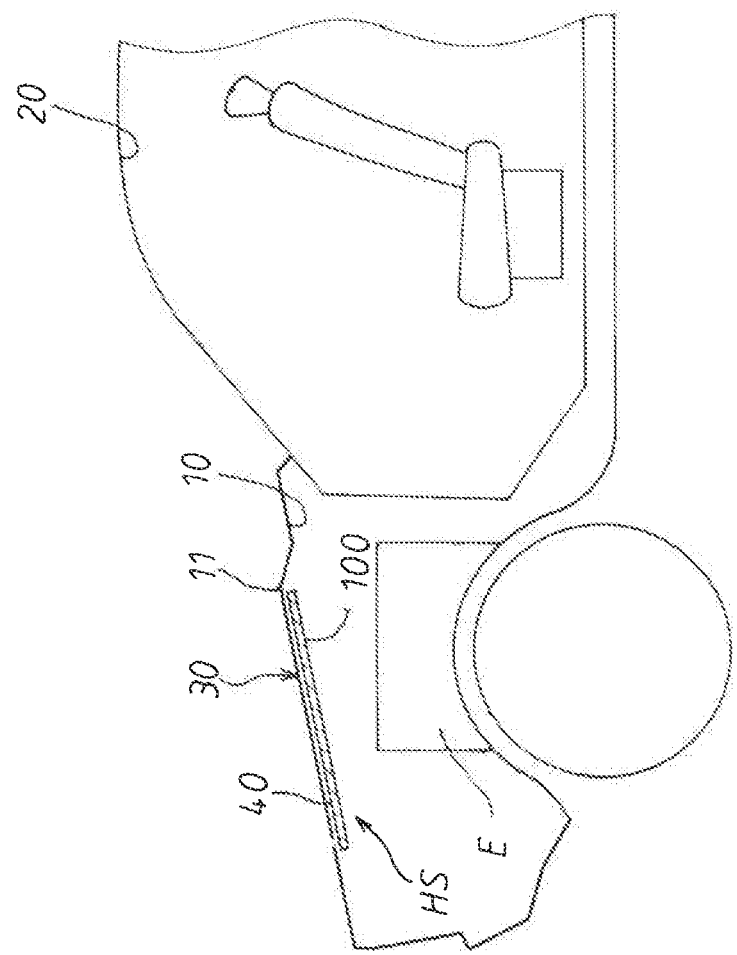
FIG. 1 is a schematic portionial cross-sectional view of a motor vehicle applying a hood silencer which is an example of an exterior silencer according to the present invention.

FIG. 1 shows an exterior silencer used as a hood silencer HS for a motor vehicle according to a first embodiment of the present invention.

The motor vehicle includes an engine room 10 and a vehicle compartment 20. The engine room 10 accommodates an engine E. The vehicle compartment 20 is behind the engine room 10 in this motor vehicle.

The motor vehicle further includes a hood 30. The hood 30 is a hinged cover that moves up and down to open and close an opening portion 11 formed in the upper wall of the engine room 10.

Figure 2:
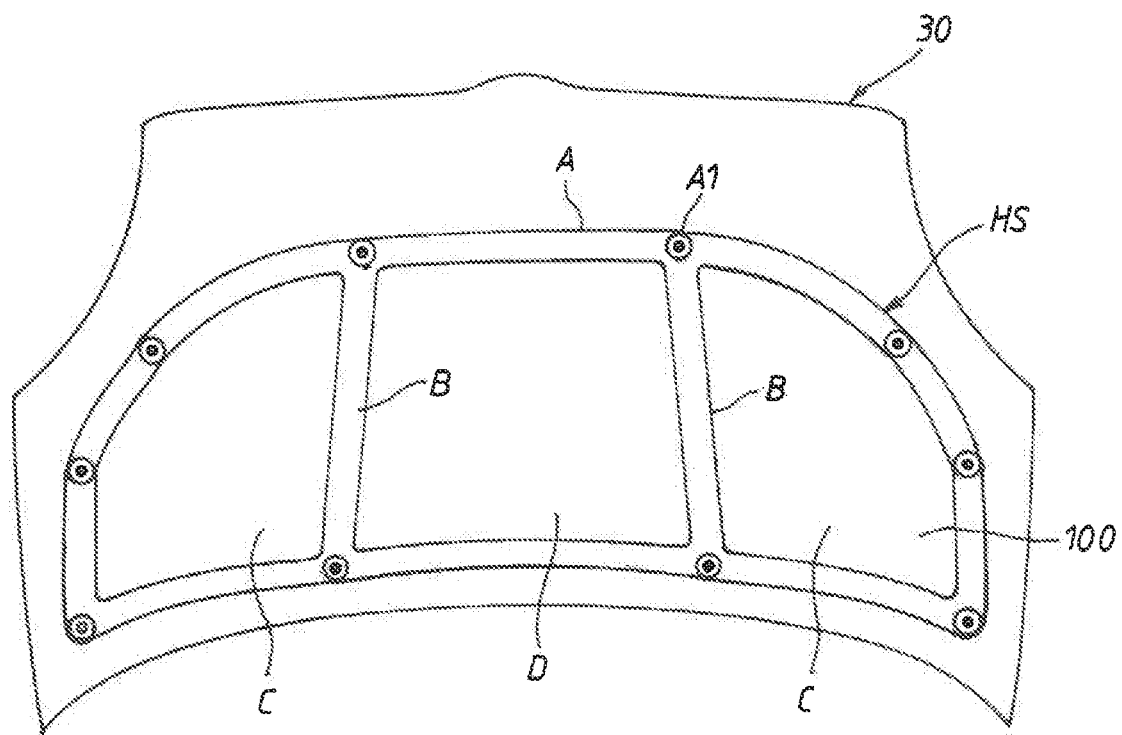
FIG. 2 is an enlarged view of the hood silencer mounted on the inner side of the hood of the motor vehicle in FIG. 1.

As shown in FIG. 2, the hood silencer HS is attached to the inner side of the hood 30 from the inside of the engine room 10. The hood silencer HS is formed under pressure to have a outer peripheral band shaped thin portion A, right and left inner band shaped thin portion B, right and left approximately fan-shaped thick portions C, and a inner square thick portion D. The outer peripheral band shaped thin portion A and the right and left inner band shaped thin portion B are thinner than the right and left approximately fan-shaped thick portions C and the inner square thick portion D. For working example, the outer peripheral band shaped thin portion A and the right and left inner band shaped thin portion B have a thickness of 2.5 (mm), and the right and left approximately fan-shaped thick portions C and the inner square thick portion D have a thickness of 20 (mm).

The outer peripheral band shaped thin portion A is the peripheral edge portion of the hood silencer HS. As shown in FIG. 2, the outer peripheral band shaped thin portion A is fastened on the inner side of the hood 30 with a plurality of clips A1. In the outer peripheral band shaped thin portion A, the areas where the clips A1 are used are compressed more densely than the areas where the clips A1 are not used (these densely compressed areas are referred to as compressed areas thereinafter) and thus thinner than the areas where the clips A1 are not used. This means that the oozing of a binder resin (described later) is caused more easily in the compressed areas for the fastening with the clips when the clips are pushed into the compressed areas.

As shown in FIG. 2, the outer peripheral band shaped thin portion A together with the right and left inner band shaped thin portion B defines the right and left approximately fan-shaped thick portions C and the inner square thick portion D inside. In the first embodiment, the areas for the fastening with the clips are the compressed areas in the outer peripheral band shaped thin portion A.

Since the outer peripheral band shaped thin portion A, the right and left inner band shaped thin portion B, the right and left approximately fan-shaped thick portions C, and the inner square thick portion D have different thicknesses as described above, the hood silencer HS has irregular thicknesses.

Figure 3:
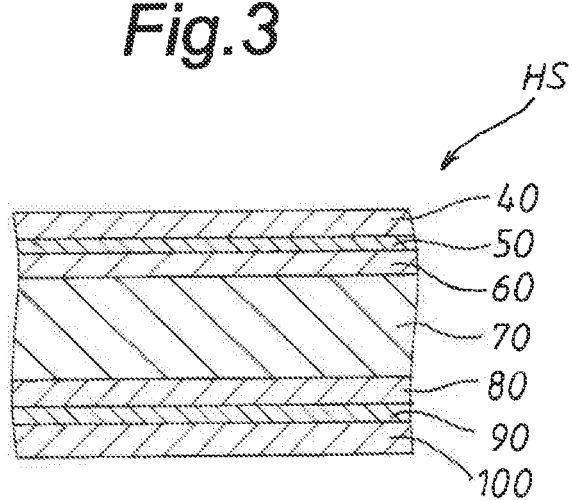
FIG. 3 is a fracture cross-sectional view of the hood silencer in FIG. 1.

As shown in FIG. 3, the hood silencer HS includes a back skin layer 40, a thin film layer 50, a shape-retaining layer 60, a sound-absorbing layer 70, a shape-retaining layer 80, an aeration-suppressing layer 90, and a front skin layer 100. These back skin layer 40, thin film layer 50, shape-retaining layer 60, sound-absorbing layer 70, shape-retaining layer 80, aeration-suppressing layer 90, and front skin layer 100 are formed under heat and pressure to constitute the above-mentioned outer peripheral band shaped thin portion A, right and left inner band shaped thin portion B, right and left approximately fan-shaped thick portions C, and inner square thick portion D.

The back skin layer 40 is a porous layer made of non-woven fabric including polyester and so on. The thin film layer 50 is disposed or layered on the back skin layer 40 from its inside. The thin film layer 50 is a film made of a thermoplastic material and having a thickness of approximately 30 (μm). In this embodiment, the thin film layer 50 is a non-air permeable layer that suppresses oozing of a binder resin out of the back skin layer 40 from the shape-retaining layer 60 (described later).

The shape-retaining layer 60 is disposed or laminated on the thin film layer 50 such that the shape-retaining layer 60 and the back skin layer 40 are opposite to each other via the thin film layer 50. The shape-retaining layer 60 is a mattress-like layer made by the heat forming of glass fibers containing a liquid binder resin while hardening the liquid binder resin to bind the glass fibers so that the shape-retaining layer 60 has rigidity and heat resistance. The shape-retaining layer 60 has a similar structure to that of the shape-retaining layer 80 (described later).

Herein, during the above-described heat forming process, the liquid binder resin is oozing from the shape-retaining layer 60 while hardening, however, the thin film layer 50 made of a non-air permeable film layer effectively suppresses oozing of the binder resin out of the back skin layer 40.

The sound-absorbing layer 70 is made of a urethane resin and disposed or layered on the shape-retaining layer 60 such that the sound-absorbing layer 70 and the thin film layer 50 are opposite to each other via or through the shape-retaining layer 60. In the first embodiment, the sound-absorbing layer 70 absorbs engine sounds (noises), which come from the engine E into the front skin layer 100 of the hood silencer HS. In the first embodiment, although forming material of the sound-absorbing layer 70 is a urethane resin, without being limited thereto, it may be a melamine resin or other soft foamed resin material.

The shape-retaining layer 80 is laminated on the sound-absorbing layer 70 such that the shape-retaining layer 80 and the shape-retaining layer 60 are opposite to each other via the sound-absorbing layer 70. The shape-retaining layer 80 is a mattress-like layer made by the heat forming of glass fibers containing a liquid binder resin while hardening the liquid binder resin to bind the glass fibers so that the shape-retaining layer 80 has rigidity and heat resistance.

Herein, the shape-retaining layer 80 has a basis weight in the predetermined basis weight range of 25 (g/m$^2$) to 130 (g/m$^2$) and an airflow quantity or airflow rate in the predetermined airflow quantity range of 200 (cc/s/cm$^2$) to 800 (cc/s/cm$^2$). The binder resin includes isocyanate. The ratio of the binder resin to the glass fibers is in a predetermined range of 10 (wt %) to 25 (wt %).

In the first embodiment, the shape-retaining layer 80 is a rigid layer made in the above way. The shape-retaining layer 80 with a high rigidity is disposed on the side of the sound-absorbing layer 70 opposite to the side for the shape-retaining layer 60 to prevent the deformation of the sound-absorbing layer 70 having a relatively low rigidity and a relatively low heat resistance. In other words, the shape-retaining layer 80 together with the shape-retaining layer 60 prevents the deformation of the sound-absorbing layer 70.

During the above-mentioned heat forming process, the liquid binder resin is oozing from the shape-retaining layer 80 while hardening. However, the aeration-suppressing layer 90 effectively suppresses oozing of the binder resin out of the front skin layer 100 (described later).

As shown in FIG. 3, the aeration-suppressing layer 90 is disposed on the shape-retaining layer 80 such that the aeration-suppressing layer 90 and the sound-absorbing layer 70 are opposite to each other via the shape-retaining layer 80. The aeration-suppressing layer 90 together with the front skin layer 100 effectively suppresses oozing of the binder resin out of the front skin layer 100 from the shape-retaining layer 80 (as described above) and improves the sound absorptivity of the hood silencer HS.

The aeration-suppressing layer 90 is a laminated body made of nonwoven fabric mainly including polyethylene and polypropylene. The aeration-suppressing layer 90 is heated and melted at a temperature in a predetermined temperature range of 140 (° C.) to 200 (° C.) to change into a fiber resin so that the aeration-suppressing layer 90 suppresses the oozing of the binder resin and improves the sound absorptivity as described above. Since the aeration-suppressing layer 90 is made by the heat forming for changing porous nonwoven fabric into fiber resin nonwoven fabric, the sound absorptivity of the aeration-suppressing layer 90 is improved.

Herein, the aeration-suppressing layer 90 has a basis weight within a predetermined basis weight range of 10 (g/m$^2$) to 40 (g/m$^2$) and an airflow quantity within a predetermined airflow quantity range of 15 (cc/s/cm$^2$) to 65 (cc/s/cm$^2$).

In this embodiment, the above-mentioned predetermined basis weight range and the above-mentioned predetermined airflow quantity range contribute to the effective suppression of the oozing of the binder resin and the effective improvement in the sound absorptivity as described above. If the basis weight of the aeration-suppressing layer 90 deviates from the above-mentioned predetermined basis weight range or the airflow quantity of the aeration-suppressing layer 90 deviates from the above-mentioned predetermined airflow quantity range, suppression of the oozing out of the binder resin and sound absorption by the aeration-suppressing layer 90 may be lowered.

The front skin layer 100 is laminated on the aeration-suppressing layer 90 such that the front skin layer 100 and the shape-retaining layer 80 are opposite to each other via the aeration-suppressing layer 90. The front skin layer 100 is made of nonwoven fabric mainly including polyester and has a basis weight in a predetermined basis weight range of 50 (g/m$^2$) to 160 (g/m$^2$). In this embodiment, the basis weight of the front skin layer 100 is suitable for ensuring the sound absorptivity or sound absorption to noises and assisting suppression by the aeration-suppressing layer 90 to the oozing out of the binder resin as described above. This may be achieved by the front skin layer 100 having a basis weight in the predetermined basis weight range of 50 (g/m$^2$) to 160 (g/m$^2$).

In the first embodiment constructed as described above, the hood silencer HS includes the aeration-suppressing layer 90 laminated between the shape-retaining layer 80 and the front skin layer 100.

Herein, the aeration-suppressing layer 90 is made of nonwoven fabric so as to have a basis weight within the range of 10 (g/m$^2$) to 40 (g/m$^2$) and an airflow quantity within the range of 15 (cc/s/cm$^2$) to 65 (cc/s/cm$^2$), as described above, Accordingly, even if the liquid binder resin is oozing out while hardening during the heat forming of the shape-retaining layer 80, in other words, during the heat and pressure forming of entirety of the hood silencer HS, such the oozing out of the oozing binder resin to the front skin layer 100 can be properly and preferably suppressed by the aeration-suppressing layer 90 under the basis weight and airflow quantity of the aeration-suppressing layer 90.

In particular, the degree of the oozing out of the binder resin to the aeration-suppressing layer 90 is large in the compressed portion (for example, pinned portion) of the hood silencer HS due to the above-mentioned thickness deviation of the hood silencer HS. However, such the oozing out of the binder resin can be properly and preferably suppressed by the aeration-suppressing layer 90 under the basis weight and airflow quantity of the aeration-suppressing layer 90.

Thus, the surface of the front skin layer 100 can ensure good appearance without being stained with the binder resin oozing out from the shape-retaining layer 80.

The front skin layer 100 is made of nonwoven fabric so as to have a basis weight within the range of 50 (g/m$^2$) to 160 (g/m$^2$). Accordingly, the front skin layer 100 plays a role for assisting suppression of the oozing of the binder resin by the aeration-suppressing layer 90. This means that the aeration-suppressing layer 90 cooperates with the front skin layer 100 to be capable of suppressing more preferably the oozing of the binder resin out of the surface of the front skin layer 100, that is, the surface of the hood silencer HS from the shape-retaining layer 80, Accordingly, even if the hood 30 is opened in a condition where the hood silencer HS as constructed above is mounted on the hood 30, the oozing of the binder resin out of the surface of the front skin layer 100 which is the surface of the hood silencer HS is suppressed preferably as previously described, thereby to be capable of maintaining the appearance of the hood silencer HS more preferably. Thus, the hood silencer HS does not give discomfort or bad visual impression to the user when the user looks at the surface of the hood silencer HS.

In the hood silencer HS, the thin film layer 50 is laminated between the back skin layer 40 and the shape-retaining layer 60. Thus, even if the binder resin oozes out toward the thin film layer 50 from the shape-retaining layer 60 during the heat forming of the shape-retaining layer 60, the oozing out of the oozing binder resin to the back skin layer 40 can be preferably suppressed by the thin film layer 50, because the thin film layer 50 is a non-air permeable layer which is formed with a film.

Thus, the back surface of the back skin layer 40 (the surface facing the hood 30) can maintain a good appearance without being stained with the oozing out of the oozing binder resin to the back skin layer 40. As a result, when the user looks at the back skin layer 40 before attaching the hood silencer HS to the hood 30, the back skin layer 40 can give a preferable appearance to the user without oozing of the binder resin from the back surface thereof.

Since the hood silencer HS has a good appearance on both the front surface and the back surface, it maintains preferable appearance as previously described, before being attached to the hood 30, for instance, when sold separately. This means to help with sales promotion of the hood silencer HS.

In the hood silencer HS, the sound-absorbing layer 70 is disposed between both of the shape-retaining layers 60 and 80. Thus, both of the shape-retaining layers 60 and 80 can effectively prevent the deformation of the sound-absorbing layer 70 with their rigidities even if the sound-absorbing layer 70 is made of a soft urethane resin.

Considering the materials recently used for sound-absorbing layers of hood silencers by the way, glass wool or resin felt has good heat resistance and rigidity, but leads to lowering of its sound absorption performance when weights of the glass wool or resin felt is reduced. Thus, there is inevitably a limit to weight reduction of the glass wool or resin felt with fuel efficiency improvement. To avoid this problem, a urethane resin tends to be employed as a material for the sound-absorbing layers.

However, a urethane resin is poor in rigidity and heat resistance. Nevertheless, the temperature in engine rooms tends to be higher due to the recent downsizing trend of the engines of motor vehicles.

To solve this problem, in the first embodiment, the sound-absorbing layer 70 made of a urethane resin is disposed between both of the shape-retaining layers 60 and 80. Herein, both of the shape-retaining layers 60 and 80 are made by binding glass fibers with a binder resin. Thus, the rigidity of each of both of the shape-retaining layers 60 and 80 may be ensured preferably.

Accordingly, both of the shape-retaining layers 60 and 80 can preferably maintain the form of the sound-absorbing layer 70 with their preferable rigidities, despite a remarkable decrease in strength of the urethane resin. As a result, the hood silencer can maintain its good merchandising without decreasing the rigidity thereof.

In a condition where the hood silencer HS with the above-mentioned construction is mounted on the hood 30, when the engine E is operated and generates engine sounds as noises, the noises are incident on the hood silencer HS, which is located above the engine E, from the front skin layer 100.

In the first embodiment, the front skin layer 100 is made of porous nonwoven fabric so as to have a basis weight within the range of 50 $(g/m^2)$ to 160 $(g/m^2)$ as described above. Accordingly, the noises from the engine E are absorbed by the front skin layer 100 under air-permeability based on a basis weight within the range of 50 $(g/m^2)$ to 160 $(g/m^2)$ and are then incident on the aeration-suppressing layer 90.

Herein, the aeration-suppressing layer 90 is improved in its sound absorption performance by processing that nonwoven fabric having a basis weight within the predetermined basis weight range of 10 $(g/m^2)$ to 40 $(g/m^2)$ and an airflow quantity within the predetermined airflow quantity range of 15 $(cc/s/cm^2)$ to 65 $(cc/s/cm^2)$ is heated so as to become fiber resin nonwoven fabric, as described above.

Accordingly, noises incident on the aeration-suppressing layer 90 are effectively absorbed by the aeration-suppressing layer 90 with the improved sound absorption performance of the aeration-suppressing layer 90, and then are incident on the sound-absorbing layer 70 through the shape-retaining layer 80.

Subsequently, the noises incident on the sound-absorbing layer 70 are preferably absorbed by the sound-absorbing layer 70 on a basis of a foamed structure of a urethane resin and then are incident on the thin film layer 50 through the shape-retaining layer 60. In this instance, the thin film layer 50 is a non-air permeable layer as described above. Thus, the noises incident on the thin film layer 50 is effectively insulated by the thin film layer 50.

After that, even if the noises are incident on the back skin layer 40 from the thin film layer 50, the noises incident on the back skin layer 40 can be absorbed by the back skin layer 40 under air permeability of the back skin layer 40, because the back skin layer 40 is made of nonwoven fabric which is porous material. In this way, the sounds may be preferably absorbed and insulated by the hood silencer HS.

As described above, in the first embodiment, the aeration-suppressing layer 90 which is disposed between the shape-retaining layer 80 and the front skin layer 100 cooperates with the front skin layer 100 to be capable of effectively suppressing oozing out of the binder resin to the front skin layer 100 from the shape-retaining layer 80 and effectively absorbing the noises from the engine E.

Herein, the front skin layer 100 with the above-noted construction is laminated on the aeration-suppressing layer 90 with the above-noted construction. Thus, the aeration-suppressing layer 90 cooperates with the front skin layer 100 to effectively suppress oozing of the binder resin to the surface of the front skin layer 100 from the shape-retaining layer 80, and the aeration-suppressing layer 90 can effectively absorb the noises from the engine E.

As described above, in the first embodiment, the thin film layer 50 disposed between the shape-retaining layer 60 and the back skin layer 40 suppress oozing of the binder resin to the back skin layer 40 from the shape-retaining layer 60 and can preferably insulate the noises from the sound-absorbing layer 70.

Incidentally, the sound absorption characteristics of the hood silencer HS with the above-mentioned construction were measured in relation to noise frequencies in a range of 400 (Hz) to 6,300 (Hz) in a sound absorptivity test in a reverberation room. For this measurement, working examples 1 to 3 and comparative example were prepared. The transmission loss characteristics of the working examples 1 to 3 and comparative example were measured in relation to the noise frequencies in a transmission loss test.

Herein, each of working examples 1 to 3 is constructed by a laminated body including the back skin layer 40, the thin film layer 50, the shape-retaining layer 60, the sound-absorbing layer 70, the shape-retaining layer 80, the aeration-suppressing layer 90, and the front skin layer 100 in the same as in the hood silencer HS of the above-mentioned embodiment. On the other hand, the comparative example is constructed by a laminated body including a back skin layer, a sound-absorbing layer, and a front skin layer. In addition, the thickness of each of working examples 1 to 3 and comparative example is 20 (mm).

In working examples 1 to 3, the back skin layer 40 is made of nonwoven fabric of 45 (g/m$^2$). The thin film layer 50 is made of a film having a thickness of 25 (μm) and a basis weight of 25 (g/m$^2$). The shape-retaining layer 60 is made of glass fibers having a basis weight of 80 (g/m$^2$) and a binder resin having a basis weight of 15 (g/m$^2$).

In working examples 1 to 3, the sound-absorbing layer 70 is made of a urethane resin having a volume density ρ=0.016. The shape-retaining layer 80 is made of glass fibers having a basis weight of 80 (g/m$^2$) and a binder resin having a basis weight of 15 (g/m$^2$) as in the shape-retaining layer 60.

In working examples 1 to 3, the aeration-suppressing layer 90 is made of fiber resin nonwoven fabric made by heating nonwoven fabric as described above, and the front skin layer 100 is made of nonwoven fabric as described above.

The specifications of the aeration-suppressing layer 90 and the front skin layer 100 in working examples 1 to 3 will now be described.

In working example 1, the aeration-suppressing layer 90 has a basis weight of 20 (g/m$^2$) and the front skin layer 100 has a basis weight of 80 (g/m$^2$) as shown in Table-1 in FIG. 4. In working example 1, the total basis weight is 697 (g/m$^2$).

In working example 2, the aeration-suppressing layer 90 has a basis weight of 40 (g/m$^2$) and the front skin layer 100 has a basis weight of 80 (g/m$^2$) as shown in Table-1 in FIG. 4. In working example 2, the total basis weight is 717 (g/m$^2$).

In working example 3, the aeration-suppressing layer 90 has a basis weight of 60 (g/m$^2$) and the front skin layer 100 has a basis weight of 80 (g/m$^2$) as shown in Table-1 in FIG. 4. In working example 3, the total basis weight is 737 (g/m$^2$).

The skin air permeability or skin airflow quantity of each of working examples 1 to 3 will now be described in relation to irregular thicknesses in working examples 1 to 3 with reference to Table-2 in FIG. 5. In working example 1, the skin air permeability in an uncompressed area is 60 (cc/s/cm$^2$) and the skin air permeability in a compressed area is 31 (cc/s/cm$^2$). In working example 2, the skin air permeability in an uncompressed area is 35 (cc/s/cm$^2$) and the skin air permeability in a compressed area is 16 (cc/s/cm$^2$). In working example 3, the skin air permeability in an uncompressed area is 10 (cc/s/cm$^2$) and the skin air permeability in a compressed area is 3 (cc/s/cm$^2$).

Under these preconditions, the sound absorption characteristics in working examples 1 to 3 and comparative example were measured in a sound absorptivity test in a reverberation room in relation to noise frequencies of 400 (Hz), 500 (Hz), 630 (Hz), 800 (Hz), 1000 (Hz), 1250 (Hz), 1600 (Hz), 2000 (Hz), 2500 (Hz), 3150 (Hz), 4000 (Hz), 5000 (Hz), and 6300 (Hz). Table 3 in FIG. 6 shows the measured sound absorption coefficients in working examples 1 to 3 and comparative example. In Table 3, when the noise frequency is 400 (Hz) in working example 1, the sound absorption coefficient is 0.30, for working example.

Figure 7:
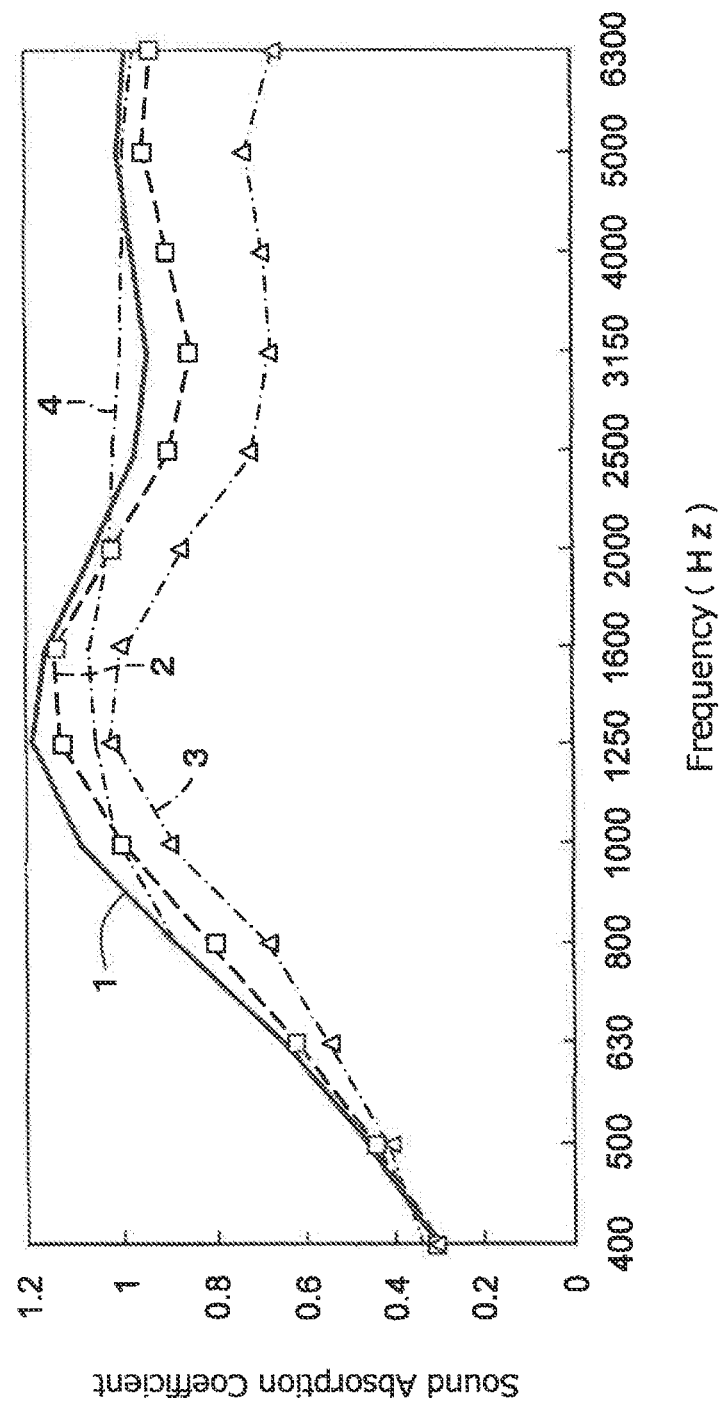
FIG. 7 is graphs respectively showing a sound absorption coefficient of each of working examples shown in FIG. 6 and a comparative example of the first embodiment as sound absorption characteristics.

Graphs 1 to 4 in FIG. 7 are based on the measurements shown in Table 3 in FIG. 6. Graph 1 shows the relationship between the sound absorption coefficients and the noise frequencies in working example 1, Graph 2 shows the relationship between the sound absorption coefficients and the noise frequencies in working example 2, Graph 3 shows the relationship between the sound absorption coefficients and the noise frequencies in working example 3, and Graph 4 shows the relationship between the sound absorption coefficients and the noise frequencies in comparative example.

Comparing Graph 1 with Graph 2 and Graph 2 with Graph 3, in the frequency range of 500 (Hz) to 6300 (Hz), the sound absorption coefficients in Graph 1 are generally higher than those in Graph 2. This means that working example 1 has generally higher sound absorption coefficients than working example 2 in the frequency range of 500 (Hz) to 6300 (Hz).

In the frequency range of 500 (Hz) to 6300 (Hz), the sound absorption coefficients in Graph 2 are higher than those in Graph 3. This means that working example 2 has higher sound absorption coefficients than working example 3 in the frequency range of 500 (Hz) to 6300 (Hz).

Comparing Graphs 1 to 3 with Graph 4, in the frequency range of 2500 (Hz) to 4000 (Hz), the sound absorption coefficients in Graph 1 are lower than those in Graph 4. In the frequency range of 800 (Hz) to 2000 (Hz), however, Graph 1 exceeds Graph 4 in an arch form. This means that the sound absorption coefficients in Graph 1, that is, in working example 1 are higher than those in Graph 4, that is, in comparative example in the frequency range of 800 (Hz) to 2000 (Hz). This conforms to the European vehicle exterior noise control standard.

In the frequency range of 2000 (Hz) to 6300 (Hz), the sound absorption coefficients in Graph 2 are lower than those in Graph 4. In the frequency range of 1000 (Hz) to 2000 (Hz), however, Graph 2 exceeds Graph 4 in an arch form. This means that the sound absorption coefficients in Graph 2, that is, in working example 2 are higher than those in Graph 4, that is, in comparative example in the frequency range of 1000 (Hz) to 2000 (Hz). This also conforms to the European vehicle exterior noise control standard.

In almost the entire frequency range, the sound absorption coefficients in Graph 3 are lower than those in Graph 4. This means that, in almost the entire frequency range, the sound absorption coefficients in working example 3 are lower than those in comparative example.

These results show that working examples 1 and 2 have better sound absorption characteristics than comparative example while effectively suppressing oozing of the binder resin out of the back surface of the back skin layer 40 and out of the front surface of the front skin layer 100 as in the hood silencer HS; however, working example 3 has worse sound absorption characteristics than comparative example although effectively suppressing oozing of the binder resin out of the back surface of the back skin layer 40 and out of the front surface of the front skin layer 100 as in the hood silencer HS.

In addition to working examples 1 to 3, the inventors made additional working examples by changing conditions such as the weights per unit area and the thicknesses of the aeration-suppressing layer and the front skin layer. The inventors then measured the sound absorption coefficients of these additional working examples in a sound absorptivity test in a reverberation room as in the above working examples. As a result, it was found that when the aeration-suppressing layer has a basis weight in the range of 10 (g/m$^2$) to 40 (g/m$^2$) and an airflow quantity in the range of 15 (cc/s/cm$^2$) to 65 (cc/s/cm$^2$), the shape-retaining layers 60 and 80 contain glass fibers having a basis weight in the range of 35 (g/m$^2$) to 130 (g/m$^2$) and an airflow quantity in the range of 200 (cc/s/cm$^2$) to 300 (cc/s/cm$^2$) and a binder resin of 10 (wt %) to 25 (wt %) with respect to the glass fibers, the additional working examples achieve good sound absorption characteristics while suppressing the oozing of the binder resin as hood silencers.

Second Embodiment

Figure 8:
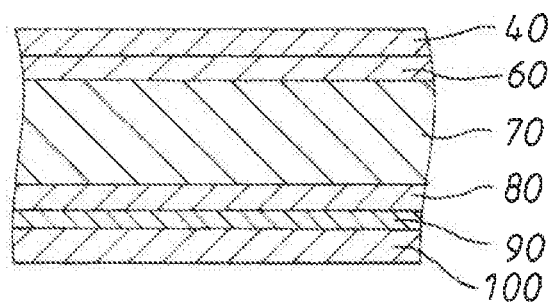
FIG. 8 is a fracture cross-sectional view of a main portion of a second embodiment of the present invention.

FIG. 8 shows a hood silencer according to a second embodiment of the present invention. Unlike the hood silencer HS of the first embodiment, the hood silencer of the second embodiment does not include the thin film layer 50. Except for that, the hood silencer of the second embodiment has the same structure as that of the hood silencer HS of the first embodiment.

As described above, the second embodiment with this structure is a hood silencer without the thin film layer 50 described in the first embodiment. In the second embodiment, a binder resin oozing from a shape-retaining layer 60 is squeezed toward a back skin layer 40 as described in the description of the first embodiment.

Although the back skin layer 40, which is made of nonwoven fabric, suppresses the oozing of the binder resin described above, the back skin layer 40 may fail to effectively suppress the oozing of the binder resin out of the surface of the back skin layer 40 depending on the specifications such as the basis weight of the back skin layer 40.

Since this hood silencer does not include the thin film layer 50 as described above, the hood silencer cannot prevent the entrance of the noise from a sound-absorbing layer 70 into the back skin layer 40; however, the back skin layer 40, which is made of porous nonwoven fabric, absorbs the noise from the sound-absorbing layer 70. The hood silencer without the thin film layer 50 thus substantially absorbs the noise, from a practical point of view. The other operation and effect of the second embodiment are the same as those of the first embodiment.

Third Embodiment

Figure 9:
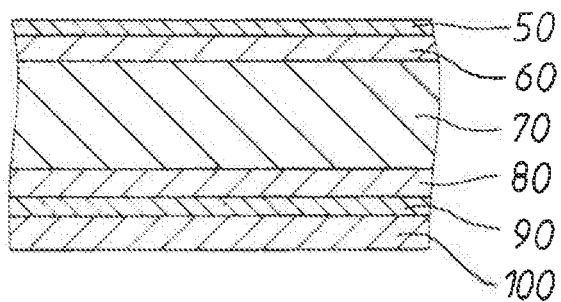
FIG. 9 is a fracture cross-sectional view of a main portion of a third embodiment of the present invention.

FIG. 9 shows a hood silencer according to a third embodiment of the present invention. Unlike the hood silencer HS of the first embodiment, the hood silencer of the third embodiment does not include the back skin layer 40. Unlike the first embodiment, the hood silencer of the third embodiment has a thin film layer 50 on its back and this thin film layer 50 is attached to the inner side of a hood 30. Except for that, the hood silencer of the third embodiment has the same structure as that of the hood silencer HS of the first embodiment.

In the third embodiment with this structure, unlike the first embodiment, the thin film layer 50 of the hood silencer is attached to the inner side of the hood 30 as described above.

The thin film layer 50 is made of a non-air permeable film as described in the description of the first embodiment. The thin film layer 50 thus effectively suppresses oozing of the binder resin out of the back surface of the thin film layer 50 when the binder resin is squeezed toward the thin film layer 50 from a shape-retaining layer 60 during the heat forming of the shape-retaining layer 60 as described in the description of the first embodiment. As a result, the thin film layer 50 keeps a good appearance on its back surface without being stained with the oozing binder resin.

Since the thin film layer 50 is a non-air permeable layer as described above, the noise entering the thin film layer 50 is effectively insulated by the thin film layer 50. In this way, the hood silencer of the third embodiment also effectively absorbs or insulates the noise. The other operation and effect of the third embodiment are the same as those of the first embodiment.

The embodiments of the present invention are not limited to the above embodiments and may include the following modified embodiments.

(1) An embodiment of the present invention is not limited to one of the hood silencers of the above embodiments and may be other silencer with a similar structure to those of the hood silencers of the above embodiments. Such a silencer may be used as an exterior silencer that is configured to be attached to the undercover for the engine of a motor vehicle or other exterior portion of the vehicle compartment of a motor vehicle, and suppresses the oozing of the binder resin out of the exterior portion and absorbs noise.

(2) An embodiment of the present invention is applied not only to an exterior portion of the vehicle compartment of a motor vehicle but also to an exterior portion of the vehicle compartment of other motor vehicle such as trucks and buses.

What is claimed is:

1. An exterior noise silencer for a motor vehicle to be arranged on a portion of a vehicle compartment of the motor vehicle, the exterior noise silencer comprising:
a sound-absorbing layer made of a sound-absorbing material;
a shape-retaining layer formed by binding fibers made of an inorganic material with a binder resin, said shape-retaining layer being laminated on said sound-absorbing layer;
a front skin layer made of a thermoplastic synthetic resin material and laminated on said shape-retaining layer; and
an aeration-suppressing layer laminated between said shape-retaining layer and said front skin layer,
wherein said aeration-suppressing layer is formed with nonwoven fabric so as to have a basis weight within a predetermined basis weight range and an airflow quantity within a predetermined airflow quantity range which are suitable for suppressing oozing of said binder resin from said shape-retaining layer upon being molded so as to be formed into a laminated body by heating and pressing together with said sound-absorbing layer, said shape-retaining layer and said front skin layer.

2. The exterior noise silencer for a motor vehicle according to claim 1, wherein:
said shape-retaining layer is a first shape-retaining layer; and
the exterior noise silencer further comprises:
a second shape-retaining layer formed by binding fibers made of an inorganic material with a binder resin, said second shape-retaining layer being laminated on said sound-absorbing layer from the side opposite to said first shape-retaining layer; and
a non-air permeable film layer laminated on said second shape-retaining layer so as to oppose said sound-absorbing layer through said second shape-retaining layer.

3. The exterior noise silencer for a motor vehicle according to claim 1, wherein:
said shape-retaining layer is a first shape-retaining layer; and
the exterior noise silencer further comprises:
a second shape-retaining layer formed by binding fibers made of an inorganic material with a binder resin, said second shape-retaining layer being laminated on said sound-absorbing layer from the side opposite to said first shape-retaining layer; and a back skin layer made of nonwoven fabric so as to be laminated on said second shape-retaining layer opposing said sound-absorbing layer through said second shape-retaining layer.

4. The exterior noise silencer for a motor vehicle according to claim 3, further comprising a non-air permeable film layer laminated between said second shape-retaining layer and said back skin layer.

5. The exterior noise silencer for a motor vehicle according to claim 2, wherein:
said fibers for forming said first shape-retaining layer are glass fibers, and
the sound-absorbing material as a material for forming said sound-absorbing layer is a urethane resin.

6. The exterior noise silencer for a motor vehicle according to claim 3, wherein:
said fibers for forming said first shape-retaining layer are glass fibers, and
the sound-absorbing material as a material for forming said sound-absorbing layer is a urethane resin.

7. The exterior noise silencer for a motor vehicle according to claim 4, wherein:
said fibers for forming said first shape-retaining layer are glass fibers, and
the sound-absorbing material as a material for forming said sound-absorbing layer is a urethane resin.

8. The exterior noise silencer for a motor vehicle according to claim 2, wherein:
said fibers for forming said second shape-retaining layer are glass fibers, and
the sound-absorbing material as a material for forming said sound-absorbing layer is a urethane resin.

9. The exterior noise silencer for a motor vehicle according to claim 3, wherein:
said fibers for forming said second shape-retaining layer are glass fibers, and
the sound-absorbing material as a material for forming said sound-absorbing layer is a urethane resin.

10. The exterior noise silencer for a motor vehicle according to claim 4, wherein:
said fibers for forming said second shape-retaining layer are glass fibers, and
the sound-absorbing material as a material for forming said sound-absorbing layer is a urethane resin.

11. The exterior noise silencer for a motor vehicle according to claim 5, wherein:
the predetermined basis weight range of said aeration-suppressing layer is in a range of 10 $(g/m^2)$ to 40 $(g/m^2)$ and the predetermined airflow quantity range of said aeration-suppressing layer is in a range of 15 $(cc/s/cm^2)$ to 65 $(cc/s/cm^2)$,
said front skin layer has a basis weight within a range of 50 $(g/m^2)$ to 160 $(g/m^2)$, and
said first shape-retaining layer has a basis weight within a range of 25 $(g/m^2)$ to 130 $(g/m^2)$ and an airflow quantity within a range of 200 $(cc/s/cm^2)$ to 800 $(cc/s/cm^2)$.

12. The exterior noise silencer for a motor vehicle according to claim 6, wherein:
the predetermined basis weight range of said aeration-suppressing layer is in a range of 10 $(g/m^2)$ to 40 $(g/m^2)$ and the predetermined airflow quantity range of said aeration-suppressing layer is in a range of 15 $(cc/s/cm^2)$ to 65 $(cc/s/cm^2)$,
said front skin layer has a basis weight within a range of 50 $(g/m^2)$ to 160 $(g/m^2)$, and
said first shape-retaining layer has a basis weight within a range of 25 $(g/m^2)$ to 130 $(g/m^2)$ and an airflow quantity within a range of 200 $(cc/s/cm^2)$ to 800 $(cc/s/cm^2)$.

13. The exterior noise silencer for a motor vehicle according to claim 2, the portion of the vehicle compartment being a hood which is capable of opening and closing an upper opening portion of an engine room of the motor vehicle,
wherein the exterior noise silencer is assembled to the hood from an inside of the engine room as a hood silencer.

14. The exterior noise silencer for a motor vehicle according to claim 3, the portion of the vehicle compartment being a hood which is capable of opening and closing an upper opening portion of an engine room of the motor vehicle,
wherein the exterior noise silencer is assembled to the hood from an inside of the engine room as a hood silencer.

15. The exterior noise silencer for a motor vehicle according to claim 4, the portion of the vehicle compartment being a hood which is capable of opening and closing an upper opening portion of an engine room of the motor vehicle,
wherein the exterior noise silencer is assembled to the hood from an inside of the engine room as a hood silencer.

16. The exterior noise silencer for a motor vehicle according to claim 5, the portion of the vehicle compartment being a hood which is capable of opening and closing an upper opening portion of an engine room of the motor vehicle,
wherein the exterior noise silencer is assembled to the hood from an inside of the engine room as a hood silencer.

17. The exterior noise silencer for a motor vehicle according to claim 6, the portion of the vehicle compartment being a hood which is capable of opening and closing an upper opening portion of an engine room of the motor vehicle,
wherein the exterior noise silencer is assembled to the hood from an inside of the engine room as a hood silencer.

18. The exterior noise silencer for a motor vehicle according to claim 8, the portion of the vehicle compartment being a hood which is capable of opening and closing an upper opening portion of an engine room of the motor vehicle,
wherein the exterior noise silencer is assembled to the hood from an inside of the engine room as a hood silencer.

19. The exterior noise silencer for a motor vehicle according to claim 10, the portion of the vehicle compartment being a hood which is capable of opening and closing an upper opening portion of an engine room of the motor vehicle,
wherein the exterior noise silencer is assembled to the hood from an inside of the engine room as a hood silencer.

20. The exterior noise silencer for a motor vehicle according to claim 11, the portion of the vehicle compartment being a hood which is capable of opening and closing an upper opening portion of an engine room of the motor vehicle,
wherein the exterior noise silencer is assembled to the hood from an inside of the engine room as a hood silencer.

* * * * *